United States Patent [19]

Hesse et al.

[11] Patent Number: 4,596,840
[45] Date of Patent: Jun. 24, 1986

[54] MIXTURE FOR THE PRODUCTION OF ACID-RESISTANT SEALING MATERIALS AND IMPREGNATING MATERIALS, A PROCESS FOR THEIR PREPARATION AND THEIR USE

[75] Inventors: Wolfgang Hesse, Taunusstein; Klaüs Raühut, Wiesbaden, both of Fed. Rep. of Germany

[73] Assignee: Hoechst Aktiengesellschaft, Fed. Rep. of Germany

[21] Appl. No.: 717,578

[22] Filed: Mar. 29, 1985

[30] Foreign Application Priority Data

Mar. 31, 1984 [DE] Fed. Rep. of Germany ....... 3412095

[51] Int. Cl.[4] ........................ C08K 3/04; C08L 61/06; C08L 63/00
[52] U.S. Cl. ..................................... 523/400; 523/424; 523/468; 525/481; 525/485; 525/488
[58] Field of Search ....................... 523/400, 424, 468; 525/481, 485, 488

[56] References Cited

U.S. PATENT DOCUMENTS

| | | | |
|---|---|---|---|
| 3,720,648 | 3/1973 | Güldenpfennig | 523/424 |
| 3,840,483 | 10/1974 | Güldenpfennig | 523/424 |
| 4,367,318 | 1/1983 | Ishimura et al. | 525/481 |
| 4,481,311 | 11/1984 | Hesse et al. | 523/424 |

FOREIGN PATENT DOCUMENTS

| | | | |
|---|---|---|---|
| 1947926 | 4/1971 | Fed. Rep. of Germany | 525/481 |
| 2839221 | 3/1979 | Fed. Rep. of Germany | 525/481 |

*Primary Examiner*—Allan M. Lieberman
*Attorney, Agent, or Firm*—Bierman, Peroff & Muserlian

[57] ABSTRACT

Mixture for the production of acid-resistant sealing materials or acid-resistant impregnating materials based on epoxy resins, resols, hardening catalysts and further customary additives, which are in the form of a cement or impregnating solution and contain, as essential constituents, (A) at least one bifunctional, low-molecular epoxy resin having an epoxide equivalent weight between 87 and 1,000, (B) at least one resol formed from at least one trifunctional phenol and formaldehyde in a molar ratio of 1:1 to 1:3, having a viscosity between 50 and 2,500 mPa.s at 20° C. and having a solids content of at least 50% by weight, and (C) hardening catalysts, cements also containing (D) fillers, in addition, and a process for the preparation of hardening products from the compounds. Thus, for example, cements or impervious, initially porous shaped articles which are resistant to solvents and weak acids and which have a low shrinkage after processing, are obtained.

16 Claims, No Drawings

MIXTURE FOR THE PRODUCTION OF ACID-RESISTANT SEALING MATERIALS AND IMPREGNATING MATERIALS, A PROCESS FOR THEIR PREPARATION AND THEIR USE

The invention relates to acid-resistant sealing materials and impregnating materials containing phenolic resin, such as are employed, for example, as cements in acid-proof installations or in the production of impervious, initially porous shaped articles made of carbon, ceramic materials or sintered metals.

It is known to use phenolic resins of the resol type as binders for acid-hardening cements. Cement powders which are essentially composed of inert filers and contain the catalysts required for hardening, in the form of acids and/or substances which split off acids, and, if appropriate, further additives, such as dyes, are usually employed as a further component of the cement.

On use as impregnating agents, the fillers are dispensed with, and the hardening is carried out in this case by heat, if appropriate in the presence of catalysts.

A very disadvantageous factor is the fact that the known products based on phenol resols lack resistance to alkali, but particularly early resistance to alkali, after they have been hardened at room temperature. "Early resistance to alkali" is to be understood as meaning the resistance of the cemented materials to alkali at a very early point in time, in order to enable the articles which have been treated or produced to be brought into use as quickly as possible. This disadvantage is caused by the structure of the phenolic resins and is based on their solubility in alkali or that of their insufficiently cross-linked hardening products. As is known, this solubility is reduced if the phenolic hydroxyl groups are completely or substantiallly etherified. Etherification can be effected by means of epoxide compounds by reaction with alkyl or alkenyl halides in accordance with the Williamson synthesis or with dialkyl sulfates or diazomethane. The processes which have been disclosed are aimed at a complete or substantial reaction of the phenolic hydroxyl group, but are not suitable for acid-hardening cements, because resols etherified in this manner no longer cure at room temperature, even in the presence of a high concentration of acid.

It is also known to prepare co-condensates having a high degree of condensation from phenol, an alkylphenol and formaldehyde in the presence of catalysts. These condensates are, however, not suitable as cement resins; they cannot, for example, be hardened with acids because of their high content of basic substances, or they cannot be hardened because of a lack of reactive groups.

It is also known to harden together mixtures composed of methylolated phenol and methylolated alkylphenols in approximately equivalent proportions. These products can, however, only be hardened under hot conditions, even in the presence of acids, and when used as a cement resin require minimum temperatures of 120° C.

The preparation of resols from reaction products of phenol with styrene and formaldehyde has also been described. These resins are soluble in water, but have a high alkali content. They are therefore not suitable for use as cement resins.

It is also known to treat phenol resols with furfural and low-molecular, volatile, alkylating reagents, in which connection the term "alkylating" is also to be understood as meaning the introduction of alkyl derivatives, such as epichlorohydrin and dichlorohydrin, in order to eliminate the sensitivity to alkali by masking the phenolic hydroxyl groups. A disadvantage inherent in this process is, however, that these masking substances are powerful industrial poisons and should therefore be avoided as far as possible, particularly in view of their application, which in most cases is carried out by manual methods. In addition, the cements prepared therefrom tend to form efflorescences composed of sodium chloride.

It is known from German Patent No. 2,411,297 to alkylate partially resols based on mixtures of alkylphenols and phenol and thus to obtain cements which are more resistant to alkali. In the case of these cements, however, the improvement in the resistance to alkali is obtained at the expense of an impairment in the resistance to solvents, which manifests itself in the surface roughness of cements brought into contact with solvent.

Finally, coating compositions composed of epoxy and phenol resol resins which can contain customary organic hardening agents for epoxy resins and which harden rapidly at a high temperature of at least about 180° C. are known from German Offenlegungsschrift No. 2,839,221. However, the use of such compositions for acid-hardening cements is not mentioned.

Since the phenolic resins hitherto known which can be employed for the preparation of acid-hardening cements in most cases have only inadequate technological properties, in particular exhibit an insufficient resistance to alkali and undergo after-shrinkage of the cement during curing, the invention is based on the object of developing phenolic resin cements and impregnating solutions containing no volatile and reactive diluents having an alkylating action, such as epichlorohydrin and/or dichlorohydrin.

However, the good properties which the phenolic resin cements hitherto used can exhibit, for example resistance to solvents and to non-oxidizing or weakly oxidizing acids, and, in particular, low shrinkage after processing, should be retained. The last property is extremely important, since only this makes it possible to use the phenolic resin cements for the production of acid-resistance tile work and infillings or impervious impregnating materials.

The invention relates to a mixture for the production of acid-resistant sealing materials or acid-resistant impregnating materials based on epoxy resins, resols, hardening catalysts and further customary additives, wherein these are in the form of cements or impregnating solutions and contain, as essential constituents (A) at least one bifunctional, low-molecular epoxy resin having an epoxide equivalent weight between 87 and 1,000, (B) at least one resol formed from at least6 one trifunctional phenol and formaldehyde in a molar ratio of 1:1 to 1:3, preferably 1:1.3 to 1:2.5, having a viscosity between 50 and 2,500 mPa.s at 20° C. and having a solids content of at least 50% by weight, and (C) hardening catalysts and (D) when the mixture is to be used for the production of cements, also fillers.

The invention also relates to a process for the preparation of hardening products from the said mixtures, the mixtures being hardened at temperatures between 10° and 170° C.

The acid-resistance cements or acid-resistant impregnating materials prepared in accordance with the invention have a good resistance to alkali and are excellently resistant to solvents and slightly oxidizing and also non-oxidizing acids. They have only a very slight tendency, or none at all, to after-shrinkage.

The low-molecular epoxy resins (A) used are, in general, liquid and have an epoxide equivalent weight of 87 to 1,000, preferably 150 to 500. Preferred epoxy resins are those which are obtained by reacting epichlorohydrin or dichlorohydrin with bisphenols, such as diphenylolmethane and/or diphenylolpropane. "Epoxy resins" are also to be understood as meaning low-molecular and fairly high-molecular compounds based on polyhydric alcohols, for example ethylene glycol, 1,2-propylene glycol and 1,2-butylene glycol, and other aliphatic compounds, for example unsaturated compounds such as dienes, fatty oils or polymeric oils.

Suitable resols (B) are resols formed from tri-functional phenols, such as the various cresols or xylenols, but preferably from unsubstituted phenol, $C_6H_5OH$, on its own or as a mixture, and formaldehyde, the molar ratio of phenolic component(s) to formaldehyde being 1:1 to 1:3, preferably 1:1.3 to 2.5. The formaldehyde can be used in the form of aqueous solutions thereof and/or as paraformaldehyde. The reaction of the two components is generally carried out at 30 to 100, preferably 40° to 80° C., in the presence of a catalyst having an alkaline action. The resols are in the form of aqueous solutions or melts having a solid resin content of at least 50, preferably above 60% by weight, and their viscosity is between 50 and 2,500, preferably at least 350, mPa.s at 20° C., but should as far as possible not exceed 2,000 mPa.s at 20° C. The catalysts used for the preparation of the resols are bases or basic salts, but preferably the oxides or hydroxides of the metals belonging to the first or second main group of the periodic system, especially however sodium hydroxide or potassium hydroxide. After the reaction, the catalyst can be neutralized with an acid which forms soluble salts in the resin. Acids suitable for this purpose are, in particular, organic acids of an aliphatic nature, for example formic acid, acetic acid, lactic acid, gluconic acid and maleic acid. The component (B), relative to 100% strength resol, is generally added in a ratio by weight of the components (A) to (B) of 1:99 to 30:70, preferably 5:95 to 20:80.

Examples of hardening catalysts (C) are inorganic acids, such as sulfuric acid, hydrochloric acid and phosphoric acid, and sulfonic acids, such as toluenesulfonic and naphthalenesulfonic acid, chlorides and esters thereof, for example those having 1–12 carbon atoms in the ester group, and particularly of monohydric alcohols of an aliphatic nature, and the acidic sulfuric esters of these alcohols. Acid salts, for example alkali metal bisulfates, and mixtures of the substances mentioned can be employed in the same manner. The less reactive compounds or the compounds which act under more rigorous conditions constitute latent catalysts.

Examples of fillers (D) are coke, artificial graphite, quartz and/or barium sulfate. Examples of customary additives which can be added are chromophoric substances, for example pigments.

The amount of hardening catalysts (C) to be employed is 0.05 to 10, preferably 0.2 to 5% by weight, relative to the sum of the components (A) to (C). Fillers are employed in a ratio by weight of 1:1 to 1:7, preferably 1:1.5 to 1:5, based on the sum of the components (A) to (C) in relation to the filler, reference being made in every case to 100% strength resol as the component (B). The hardening temperature of the mixtures is between 10° and 170° C., depending on the purpose for which they are used.

The preparation of the cements is advantageously effected by mixing, immediately before use, the mixture of resol and epoxy resin with a cement powder composed of hardening catalyst (C) and filler (D). The resulting cement is then applied to or between the materials to be cemented and is immediately processed by customary methods, hardening generally being effected at temperatures in a particular case between 10 and 120, preferably 10 and 80, but especially between 15° and 35 °C.

For use as impregnating agents, it is preferable to add to the resin solutions latent catalysts, such as neutral esters of strong acids, for example ethyl toluene-sulfonate. The porous shaped article to be impregnated, composed, for example, of graphite, ceramics or sintered metal, is impregnated with the resin solution and heated at temperatures from 130 to 170, preferably 130° to 160 °C. The crosslinking of the resin component takes place in the course of this, resulting in sealing of the cavities of the porous material and producing impervious shaped articles.

Decisive factors for assessing the quality of a cement are the properties of the resols before mixing with the cement powder and the properties of the cement after mixing, the course of hardening and the chemical and physical properties of the end product. The resol should have a low degree of condensation and low viscosity, so that good wetting of the filler is ensured even after storage for a long time. Equally, the degree of condensation of the resol should only increase insubstantially or not at all during storage, so that good wettability of the filler is retained and the stability on storage is good. Otherwise processing defects can occur. After the cement powder has been mixed with the resol, an enlargement of the phenolic resin molecule, with the inclusion of the epoxy compound, sets in immediately, as a result of the reaction brought about by the hardener, and this finally leads to a complete loss of the processing consistency. The time between stirring the cement and this loss, the so-called pot life, should comprise a period of time sufficiently long for convenient processing to be possible and should be about half to 1 hour. After processing, the cement should be hardened as soon as possible at room temperature with slight linear shrinkage and should develop an adequate and increasing resistance to chemicals, so that it can be used as a cement which is resistant to chemicals.

In the following example, parts denote parts by weight and % denotes percent by weight.

EXAMPLE (a) Preparation of the resol 1,880 parts of phenol were melted in an apparatus equipped with a stirrer and a thermometer, 98 parts of aqueous (33% strength) sodium hydroxide solution were added and the mixture was cooled to 60° C. 336 parts of aqueous (37% strength) formaldehyde and 770 parts of 91% strength paraformaldehyde were added at this temperature, at the rate allowed by the exothermic reaction, in the course of about 2 hours. A viscosity of 850 mPa.s at 20° C. was reached after 9 hours, and the product had a residue of 81.5% (1 hour at 135° C.). 281 parts of technical grade diglycidyl ether of 4,4'- diphenylolpropane (epoxide equivalent 190) and 96 parts of distilled water were added to the 3,084 parts of resin solution present in the reaction vessel. The resulting resin solution had a residue of 79.9% (1 hour at 135° C.) and a viscosity of 800 mPa.s at 20° C. and could be diluted with water in a ratio of 1:0.4. Yield: 3,461 parts.

(b) Preparation of the cement

A cement powder was prepared from 92 parts of carbon (graphite powder) and 4 parts of p-toluenesulfochloride, 1.5 parts of naphthalenedisulfonic acid and 1 part of sodium bisulfate; 100 parts of this were mixed with 70 parts of the resin solution to give a cement. The cement thus prepared had a service lift (pot lift) of approx. 60 minutes at 20° C. A Shore hardness D of 50 was reached after 24 hours at this temperature.

(c) Chemical testing

For testing the resistance to chemicals, cylindrical test specimens having a height of 25 mm and a diameter of 25 mm were prepared from the cement and were stored for 8 days at room temperature. After the test specimens had been subsequently stored for 40 hours in boiling media, for example 20% strength and 70% strength sulfuric acid, hydrochloric acid, acetic acid, chloroform, toluene and butyl acetate, they proved to be resistant.

(d) Physical testing

Linear shrinkage was measured on cylindrical test specimens of diameter 25 mm and length 90 mm by a method derived from ASTM C 358. The first measurement of length was carried out 24 hours after the preparation of the test specimens and was used as an initial value. Over an observation period of 42 days, the linear shrinkage at room temperature was 0.15%.

We claim:

1. A mixture for the production of acid-resistant sealing materials or acid-resistant impregnating materials, wherein these are in the form of cements or impregnating solutions containing as essential constitutents
   (A) at least one bifunctional, low-molecular liquid epoxy resin having an epoxide equivalent weight between 87 and 1,000,
   (B) at least one resol formed from at least one trifunctional phenol and formaldehyde in the form of an aqueous solution or a melt in a molar ratio of 1:1 to 1:3, having a viscosity between 50 and 2,500 mPa.s at 20° C. and having a solids content of at least 50% by weight, and
   (C) hardening catalysts, in the form of acids or materials which split off acids, of 0.05 to 10% by weight, calculated in relation to the sum of the components (A) to (C), and cements containing
   (D) fillers, in a ratio of weight based on the sum of the components (A) to (C) in relation to the filler of 1:1 to 1:7, (B) being calculated in each case as 100% strength resol, and
   wherein the ratio by weight between the components (A) and (B) is 1:99 to 30:70 relative to 100% strength resol.

2. A mixture as claimed in claim 1, wherein the molor ratio in the component B) is 1:1.3–2.5.

3. A mixture as claimed in claim 1, wherein the ratio is 5:95 to 20:80.

4. A mixture as claimed in claim 1 wherein the proportion of component (C) is 0.2 5% by weight and the ratio of fillers to the sum of components (A) to (C) is 1:1.5 to 1:5.

5. A mixture as claimed in claim 1, wherein the hardening catalysts employed are at least one component selected from the group consisting of inorganic acids, acid salts, sulfonic acids, and any of their chlorides and esters having 1 to 12 carbon atoms in the esters group.

6. A process for the preparation of hardening products which comprises adding a mixture composed of
   (A) at least one bifunctional, low-molecular liquid epoxy resin having an epoxide equivalent weight between 87 to 1,000,
   (B) at least one resol formed from at least one trifunctional phenol and formaldehyde in the form of an aqueous solution or a melt in a molar ratio of 1:1 to 1:3, having a viscosity between 50 and 2,500 mPa.s at 20° C. and having a solids content of at least 50% by weight, with
   (C) a hardening catalyst, in the form of acids or materials which split off acids, of 0.05 to 10% by weight, calculated in relation to the sum of the components (A) to (C), and, in addition,
   (D) fillers to cements in a ratio by weight based on a sum of the components (A) to (C) in relation to the filler of 1:1 to 1:7, (B) being calculated in each case as 100% strength resol, and hardening this mixture at temperatures between 10° and 170° C., and
   wherein the ratio by weight between the components (A) and (B) is 1:99 to 30:70 relative to 100% strength resol.

7. Process as claimed in claim 6, wherein the hardening temperature in the case of cements is between 10° and 120° C.

8. Process as claimed in claim 7 wherein the temperature is between 10° and 80° C.

9. Process as claimed in claim 8, wherein the temperature is between 15° and 35° C.

10. Process as claimed in claim 6, wherein the hardening temperature in the case of impregnating solutions is between 130° and 170° C., and latent hardeners are employed as component (C) in the hardening process.

11. Process as claimed in claim 10, wherein the temperature is between 130° and 160° C.

12. Process as claimed in claim 7, wherein the molar ratio in the component (B) is 1:1.3–2.5.

13. Process as claimed in claim 6, wherein the ratio is 5:95 to 20 to 80.

14. Process as claimed in claim 6, wherein the proportion of component (C) is 0.2 to 5% by weight and the ratio of fillers to the sum of components (A) to (C) is 1:1.5 to 1.5.

15. Process as claimed in claim 7, wherein the hardening catalysts employed are at least one component selected from the group consisting of inorganic acids, acid salts, sulfonic acids, and any of their chlorides and esters having 1 to 12 carbon atoms in the ester group.

16. An impervious, initially porous shaped article composed of graphite, ceramics or sintered metal which has been produced by means of impregnating solutions as claimed in claim 1.

* * * * *